(12) United States Patent
Shields et al.

(10) Patent No.: US 6,940,808 B1
(45) Date of Patent: Sep. 6, 2005

(54) ADAPTIVE RATE TRAFFIC RECOVERY MECHANISM FOR COMMUNICATION NETWORKS

(75) Inventors: James A. Shields, Ottawa (CA); Mark Allaye-Chan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/548,667

(22) Filed: Apr. 13, 2000

(51) Int. Cl.[7] ............................................... H04L 12/26
(52) U.S. Cl. ...................................... 370/216; 370/232
(58) Field of Search ........................ 370/216, 222–225, 370/228, 232, 235, 465, 217, 221

(56) References Cited

U.S. PATENT DOCUMENTS

| | | | | |
|---|---|---|---|---|
| 5,852,601 A | * | 12/1998 | Newman et al. ............. | 370/230 |
| 6,014,708 A | * | 1/2000 | Klish ........................... | 709/232 |
| 6,032,272 A | * | 2/2000 | Soirinsuo et al. ............ | 714/706 |
| 6,125,397 A | * | 9/2000 | Yoshimura et al. .......... | 709/235 |
| 6,195,330 B1 | * | 2/2001 | Sawey et al. ................ | 370/220 |
| 6,496,519 B1 | * | 12/2002 | Russel et al. ................ | 370/465 |
| 6,667,973 B1 | * | 12/2003 | Gorshe et al. ............... | 370/376 |

FOREIGN PATENT DOCUMENTS

| | | | | |
|---|---|---|---|---|
| EP | 0 920 152 A2 | | 6/1999 | ............. H04J 3/14 |
| EP | 0 994 591 A2 | | 4/2000 | ............. H04J 3/08 |
| GB | 2286745 A | * | 8/1995 | ......... H04L 12/437 |

* cited by examiner

*Primary Examiner*—Man U. Phan
*Assistant Examiner*—Toan Nguyen
(74) *Attorney, Agent, or Firm*—Guerin & Rodriguez, LLP

(57) ABSTRACT

A traffic recovery mechanism for communication networks uses a layer-1 adaptive rate protection scheme that compliments layer-3 restoration mechanisms. The protection scheme allocates less bandwidth to the traffic during a protection switch than during the normal operating conditions. This scheme allows the network to roll off more gracefully from the perspective of the applications routed through it. Rate adaptation is effected by a new interface between the data equipment and the transport network, which switches information transfer rate between two or more predetermined levels.

20 Claims, 9 Drawing Sheets

ADAPTIVE RATE TRAFFIC RECOVERY MECHANISM FOR COMMUNICATION NETWORKS

BACKGROUND OF THE INVENTION

1. Field of the Invention

This invention is directed to communication networks and in particular to an adaptive rate traffic recovery mechanism for communication networks.

2. Background Art

OSI Layers

OSI (open system interconnect) reference model shown in FIG. 1, defines a framework of layered protocols for data communications, designed with the purpose to allow users to communicate with each other. Layering divides the total communications problem into smaller functions, while ensuring independence of each layer, by defining services provided to the next layer, independent of how these services are performed. A short description of the layers pertinent to this specification follows.

The physical layer (L-1) is concerned with transmitting raw data bits over a communication channel, and informing the higher level layers of loss of connectivity. An example of physical layer technology is SONET/SDH, that transports information between two section, line and path terminals. The optical layer, or L-0 is a subdivision of L-1. The D/WDM network operates at the L-0 level, transporting a plurality of channels over a fiber.

The SONET/SDH path sublayer deals with establishing a connection between two path terminating nodes (e.g. ADM's, routers, bridges, PBX's, switches, etc), for transporting services such as DS1 or DS3. The services and the path-specific information (path overhead POH), including path integrity information, are mapped into the format required by the line sub-layer, which is called STS-1 frame. An STS-1 is carried by an optical carrier OC-1.

The SONET line (or SDH multiplex section) sublayer provides synchronization and multiplexing for the path layer between line terminating nodes (e.g. ADMs or terminals). The multiplex frame STS-N comprises a plurality N of interleaved STS-1's and line-specific information (line overhead LOH), including line integrity information. For example, if 48 STS-1's are multiplexed together, the resulting signal is called STS-48, which is carried by an optical carrier OC-48.

Concatenation is a procedure by which a plurality N of STS-1's are kept together within the multiplexed signal, so that the STS-Nc signal is transported, switched and further multiplexed as a whole entity rather than N individual STS-1's. This procedure is used for services that operate at high rates, where an STS-1 granularity involves unwarranted processing. The STS-Nc has one POH for the entire signal. An OC-Nc is the optical equivalent of an STS-Nc.

The data link layer L-2 imposes a frame structure to the data and transmits the frames sequentially based on their address. One function of L-2 is the acknowledgement of messages sent over a link. Examples of L-2 technologies are ATM, LAN (Ethernet), frame relay, etc. Link protocols are designed to deal specifically with the types of impairments of the physical link, and comprise mechanisms to deal with errors, delays encountered in transmitting information, lost information, bandwidth conservation, contention resolution. The detailed mechanisms employed by a link protocol are usually specific to a particular interface standard (e.g. ATM-SONET) and are tailored to the services supported by the interface.

The third layer L-3 is the network layer. L-3 provides the functional and procedural means to set-up and terminate a connection, to route data and to control the data flow across the network. The network layer exchanges frames with the link layer, and provides data units (packets) generated by adding to the frame a header, routing and flow control information. An internet sublayer was created (IP or internet protocol) to accommodate different protocols used by different networks. This sublayer is regarded as being the top part of the network layer. The IP networks may use point-to-point connectivity protocols (PPP), Ethernet as layer-2, and copper as layer-1.

The fourth L-4 has a number of functions, not all of which are necessarily required in any given network. In general, this layer is concerned with assembly/re-assembly of data units, multiplexing/demultiplexing, error correction, etc. Illustrated in FIG. 1 in the transport layer-4 are the transport control protocol (TCP), and the hyper text transport protocol (HTTP); other protocols may also be present, according to the application. The TCP evolved over many years of use in the wired local area network (LAN) and wide area network (WAN) arenas.

The remaining layers are application oriented, being concerned with providing various service functions to the users, such as session control, and other services.

Network Reliability v. Bandwidth Demand

Network users and providers are looking for reliable networks at acceptable bandwidth (BW) cost. Reliability is the ability of the network to carry the information from source to destination with errors below a certain threshold. In general, each OSI layer provides mechanisms to address this issue.

FIG. 1 shows the most relevant protocols that deal with recovery, for each layer. FIG. 1 also shows the symbol for a network element specific for a respective OSI layer, namely a router for L-3, an ATM switch or an Ethernet mapper for L-2, a SONET Line Terminating Equipment (LTE) or Path Terminating Equipment (PTE) for L-1, and an optical add-drop multiplexer OADM for the optical layer.

Protection is a traffic preserving strategy for managing the usage of the working and the dedicated redundant bandwidth in the network. Automatic protection acts quickly enough to ensure that the client's connections remain unaffected by failures. Typically, protection switching times are less than 200 ms. On the other hand, protection implies reserving bandwidth, and therefore transport networks are often 100% overbuilt. Most protection schemes require high speed signalling.

Restoration does not guarantee that the user's connections will remain unaffected, but following restorations, any dropped connection can be reestablished. Restoration typically works by re-applying the routing algorithm. As a result, the restoration times are typically much greater than the protection times. On the other hand, no dedicated protection bandwidth is necessary, so that the network may be over-engineered in capacity by only 60%.

SONET/SDH technology is provided with very effective and fast protection mechanisms. Protection protocols for SONET/SDH networks are designed for various network configurations, such as linear (1+1; 1:1 and 1:N) and ring networks (unidirectional path switched rings UPSR and bidirectional line switched rings BLSR). The protection switching mechanisms also differ according to the sublayer—the line sublayer uses different protocols than the path sublayer. Thus, 1+1, UPSR and 1:1 schemes require 100% redundancy. 1:N, 2F (two-fiber)-BLSR and 4F-BLSR schemes require less than 100% network overbuild.

L-1 is also provided with restoration schemes applicable to mesh networks constructed with broadband digital cross-connect (BCDS).

The only recovery mechanisms yet available for L-0 are protocols adapted from L-1. Thus, L-0 uses 1+1 protection and a variant of the BLSR called optical BLSR (oBLSR). A new protection scheme for this layer is proposed in the patent application Ser. No. 09/288,310 (Allen), for a 'Path Switched Shared Protection', filed Apr. 8, 1999, and assigned to Nortel Networks Corporation.

L-2 is provided with both restoration and protections protocol-specific schemes. Restoration schemes provide error detection only, error detection and forward error correction, or error detection and retransmission. The ATM layer for example has two separate capabilities for recovering from faults, namely PNNI (private network—network interface) restoration and ATM protection. PNNI uses a QoS (quality of service) based routing, enforcing negotiated QoS levels by mediating conflicting requests from competing services and the appropriate prioritization of access requests. Other L-2 technologies may use specific QoS controls.

For IP networks (L-3), setting aside a significant proportion of bandwidth for protection is considered wasteful and not cost effective. The IP network is provided with a number of L-3 protocols that allow restoration in the event of a failure in the network, as shown in FIG. 1. Even if layer-1 provides no protection in the event of a failure, layer-3 is able to route around the problem. On the other hand, layer-3 takes long periods to converge on a new routing solution. Such delays are not any more acceptable.

The most commonly used routing protocol within an autonomous system is called the open shortest path first (OSPF) and between autonomous systems is the border gateway protocol (BGP). Under optimal conditions, OSPF restoration can occur in several seconds, but typical convergence times are much greater, i.e. several minutes. Restoration times can be long enough to cause TCP session to be dropped. BGP convergence also frequently requires minutes. There are no service quality guarantees provided in the current routing protocols. Following restoration, congestion problems could be prevalent.

In short, the congestion problems (queuing bottlenecks) at L-3 are currently solved using additional BW. As well, the existing protection protocols applied to SONET/SDH transport data networks (L-1) use redundant BW. While the switching time is quite fast for SONET/SDH, the BW utilization is not efficient. Achieving improved BW efficiency is one of the main challenges for continuing the use of the installed SONET/SDH equipment at L-1.

But increasing the transmission capacity of a network becomes more and more important to network providers, and so becomes the cost of the bandwidth. Wise use of the BW is not any more an option; it increasingly becomes an important issue.

There is a need to provide a communication system which provides a better use of BW, while ensuring an acceptable level of reliability.

SUMMARY OF THE INVENTION

It is an object of the invention to provide a traffic recovery mechanism using a L-1 adaptive rate protection scheme. The adaptive rate protection scheme compliments layer-3 restoration mechanisms.

It is another object of the invention to provide a protection scheme that allocates less bandwidth to the traffic during a protection switch than during the normal operating conditions. This scheme will allow the network to roll off more gracefully from the perspective of the applications routed through it.

A new interface is defined between the data equipment and the transport network, where the information transfer rate may be switched between two or more predetermined levels.

According to one aspect of the invention there is provided a method of increasing the BW allocated to working traffic within a transport network connecting two data terminals, comprising, distributing the total BW available for said transport network into a first BW and a second BW, transmitting traffic in a data pipe of said first BW during normal operation of said transport network, and squeezing said data pipe to said second BW whenever a protection switch occurs in said transport network, wherein flow control mechanisms present at said data terminal operate to compensate for the change from said first to said second BW.

According to another aspect of the invention there is provided a method of increasing the BW allocated to working traffic within a transport network connecting two data terminals, comprising, selecting a first and a second route between said end nodes and distributing the total BW available for said transport network between said routes as a first and a second BW, transmitting traffic in a data pipe of said total BW during normal operation of said transport network along said first and said second routes, and squeezing said data pipes to one of said first and second BW, whenever a protection switch occurs in said transport network, wherein flow control mechanisms present at said data terminal operate to compensate for the change from said first to said second BW.

According to a further aspect of the invention there is provided an optical communication network for exchanging traffic between two data terminals connected at a respective end node, and recovering traffic in case of a fault at the physical layer, comprising, an adaptive rate interface at each said end node for changing the transmit and receive rate between a fast rate to a slow rate, a link between said adaptive rate interfaces for accommodating a traffic pipe of a first BW corresponding to said fast rate during normal operation, and a squeezed traffic pipe of a second BW corresponding to said slow rate during a protection switch, and protection switching means for detecting an interruption in said traffic pipe and operating a protection switching means.

According to yet another aspect of the invention there is provided a method of operating an adaptive rate interface connected between a data terminal and an optical communication network comprising, exchanging traffic of a first rate between said data terminal and said network in a normal state of operation, exchanging traffic of a second rate between said data terminal and said network during a squeezed state of operation, and transiting from said squeezed state to said normal state during a recovery state.

A main advantage of this invention is a better use of the available bandwidth, since less BW needs to be allocated for protecting the traffic.

To reduce the effectiveness of a connection is less catastrophic than a complete breaking of a connection in a L-3 network, since L-3 is equipped with flow control mechanisms to optimise the traffic engineering. The cost of providing a bandwidth reduced connection for protection is optimally small. Moreover, bandwidth used in current networks for protection, can be freed for other applications.

Another advantage of the invention for the particular case of SONET/SDH, is that the protection scheme does not require replacing the existing SONET/SDH infrastructures. Furthermore, the protection scheme according to the invention is tailored to the needs and characteristics of an IP network.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1:
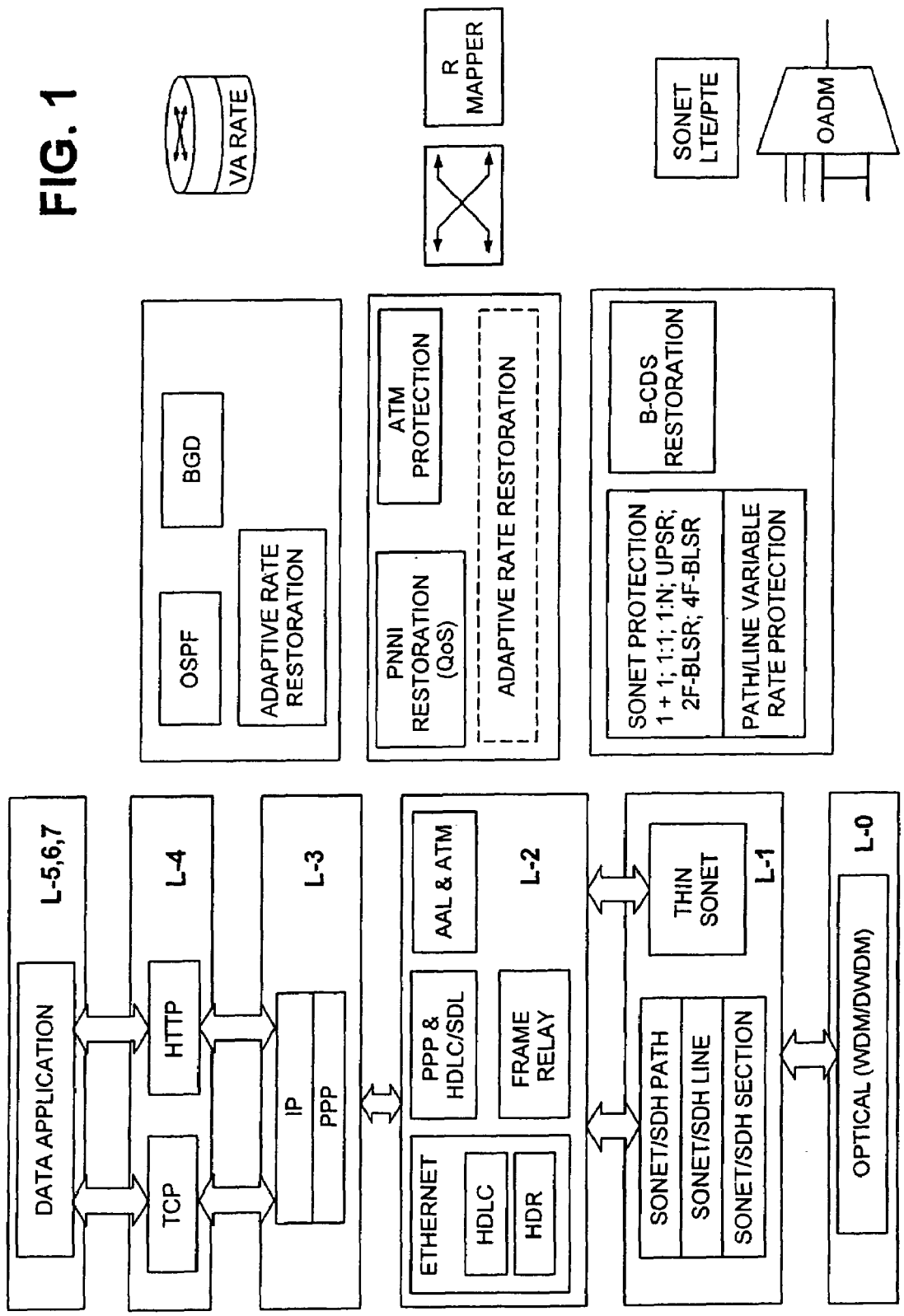
FIG. 1 shows the OSI layers and the mechanisms for traffic recovery according to the invention.

The adaptive rate recovery mechanism according to the invention uses a variable BW data pipe between two data terminals. Variable or adaptive rate implies allocating less bandwidth for the traffic during a protection switch than for the traffic during the normal operation.

The term 'pipe' is used herein to define a logical connection between two data terminals. Squeezeable pipes are a new class of data transport service designed to work in conjunction with L-1 protection switching mechanisms. The squeezeable pipes could be implemented at the path or line level, based on the existing SONET path or line switched protection protocols. The L-3 device will not detect that any connection has been broken but may receive pause frames informing it to reduce its transmission rate. In L-2 and L-3, the data network is provided with a number of protocols that allow restoration in the event of a failure in the network, as discussed above. Rate adaptation according to the invention can be implemented at L-2 or L-3.

In short, when the pipe is squeezed-down, the available BW is reduced, but the pipe is not broken. For example, a failure in the OC-48c working link results in the data being carried at an OC-3c rate. A graceful service degradation occurs. The higher layer device will not detect that a connection has been broken, but it may receive pause frames informing it to reduce its transmission rate.

In this specification, SONET also implies SDH, the protection for SDH being governed by similar protection protocols. It is also to be understood that the underlying principle of the invention can be applied to technologies other than SONET, or to other combinations of transport, link, and network services.

The terms 'working' and 'protection' are used for the route during normal working operation conditions, and during a protection switch, following a failure of the working connection, respectively. The terms 'path' and 'line' are used for defining the connections between two PTE (path terminating equipment) or LTE (line terminating equipment) nodes.

The terms 'protected class' refers to path connections which have 100% redundant BW provisioned for protection, i.e. BW is reserved for both working and protection traffic. The term 'unprotected class' refers to path connections that are not protected, so that the traffic is lost in the event of a failure. The term 'selective protection' in the context of SONET line protection switching refers to connections in which individual STS's travelling on a given fiber are protected, while others are not. 'Extra traffic ET' is a lower priority traffic which is transported on the protection fiber between two LTE's, during normal operation of the network. The ET is dropped when a line protection switch occurs.

The term 'route' is used to define the physical connection (fiber spans) between two L2/L3 terminals, the connection passing through a number of intervening nodes. 'Diverse routing' refers to different routes engineered for working and protection traffic.

FIG. 1 shows the mechanisms for recovery according to the invention and the OSI layer where the mechanisms operate. The variable rate protection at L-1 may be provided at the line sublayer or at the path sublayer as shown in bold on FIG. 1 for L-1. Rate adaptation can be effected at L-3 by the router, or at L-2, by an Ethernet mapper, as also shown in bold.

Figure 2:
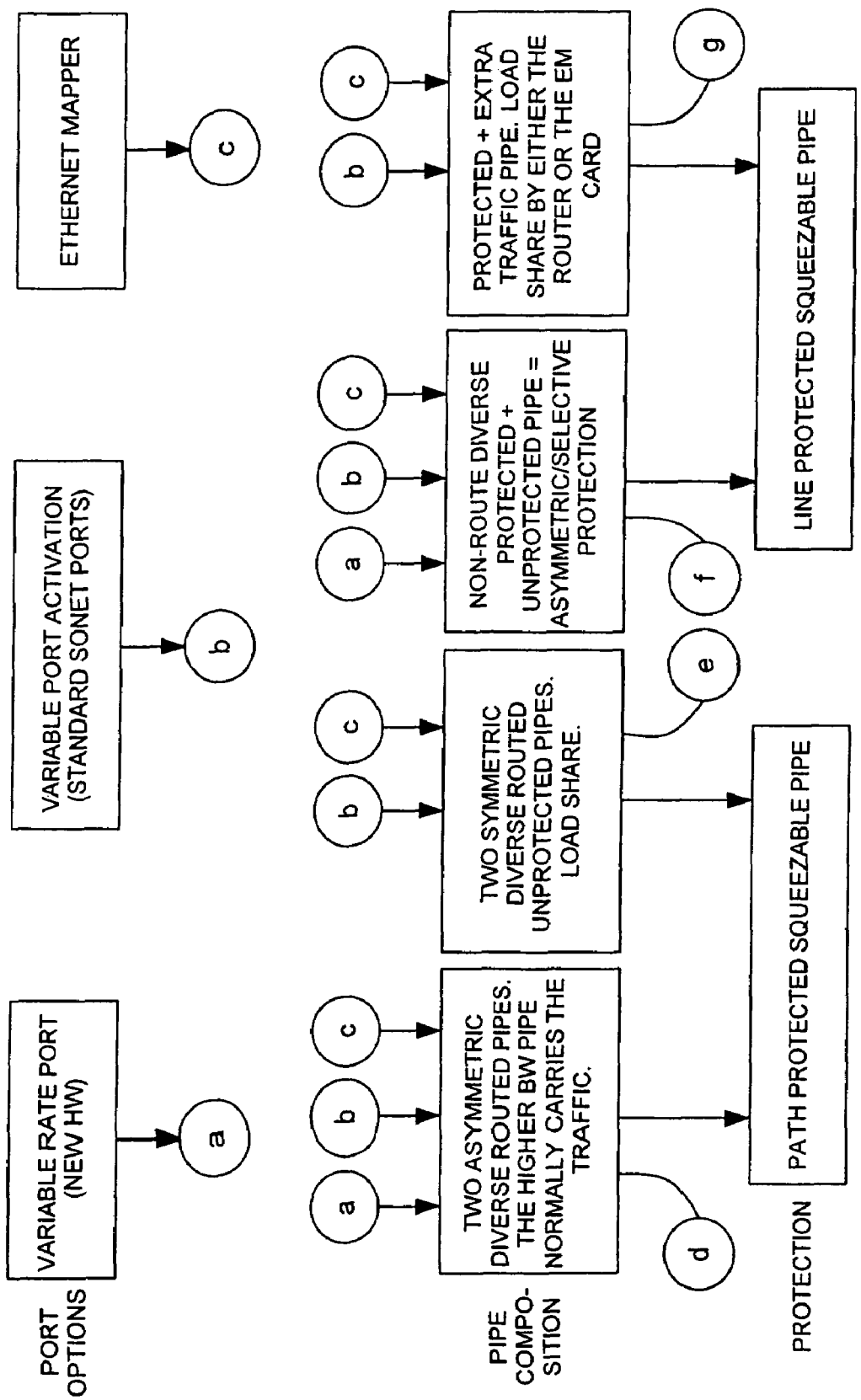
FIG. 2 shows squeezeable pipes options.

FIG. 2 illustrates possible options for squeezeable pipes. The first row of boxes show some available port options between the data terminal and the transport network.

Option a is implemented by using a router with a variable rate port (interface), to provide the BW adaptation in the event of a pipe squeeze. The interface dynamically adjusts its BW between two or more possible rate options. The squeezeable pipe is extended from the transport network into the router with this option.

The port option b is implemented by using standard SONET ports between the transport network and the router, and by selectively activating and deactivating the ports to provide the BW adjustment. With this option, the squeezeable pipe is again extended into the router. However, while this solution uses standard SONET ports, it may disadvantageously result in proliferation of router ports.

The port option c is implemented by using an Ethernet-to-SONET mapper (EM) as the interface between the transport network and the router. This option is preferred, as it does not imply changes to the existing routers.

The options for the pipe composition is provided in the second row of boxes in FIG. 2, and the third row of boxes shows the protection options available with squeezeable pipes, namely path protected squeezeable pipes (PPSP) and line protected squeezeable pipes (LPSP).

Path Protection for Squeezeable Pipes

Path protection for squeezeable pipes operates similar with path protection in general. For effective path protection against link failures, the protection path must be route diverse, using unprotected connections. The PPSP's can be designed to squeeze on a unidirectional basis, which gives better flexibility than a bidirectional squeeze and switch.

Figure 3A:
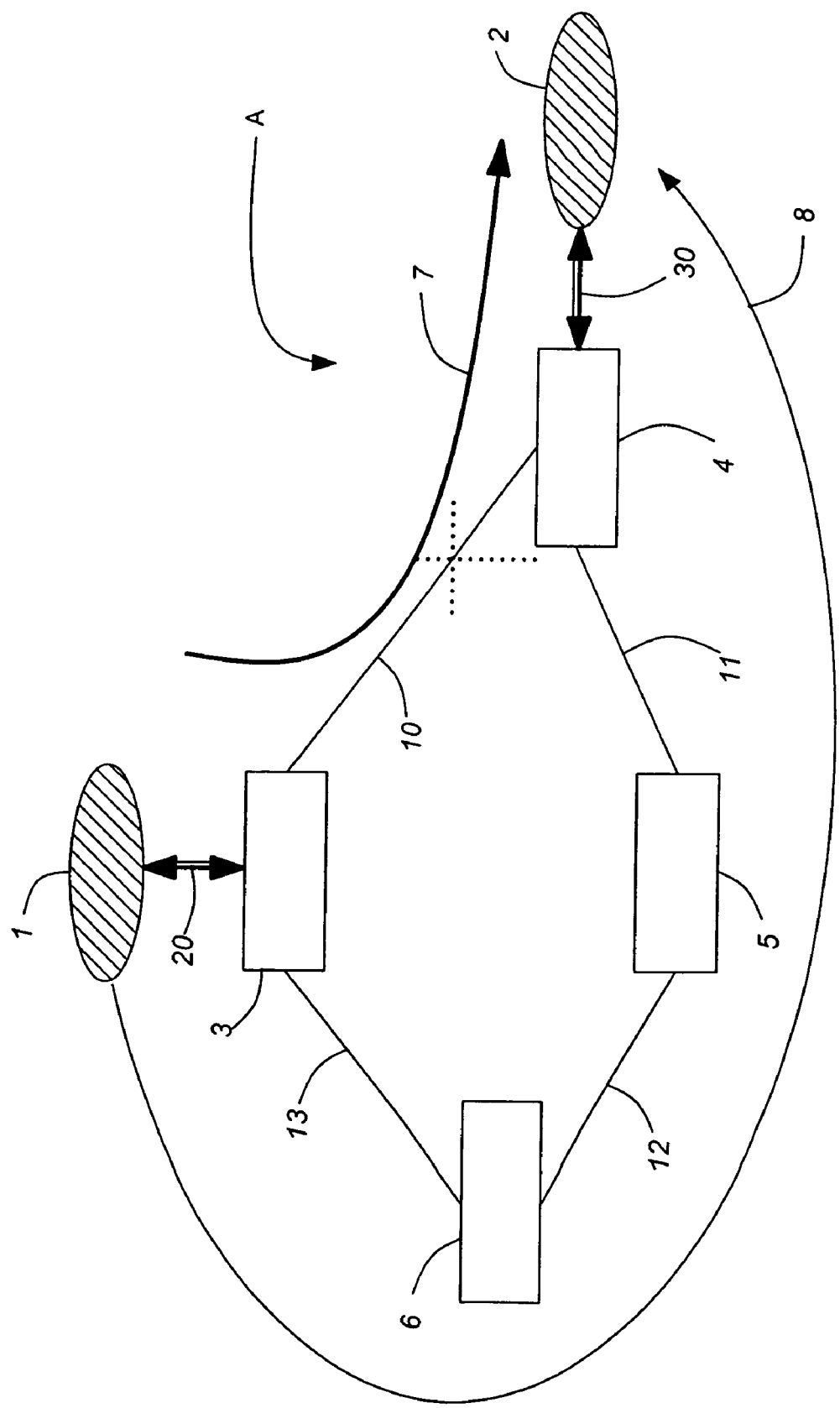
FIG. 3A illustrates the implementation of an asymmetric path protected squeezeable pipe.

FIG. 3A shows a unidirectional path switched ring (UPRS) network A, which connects data terminals 1 and 2. The example of FIG. 3A uses a pipe composition as shown at d, with two asymmetric diverse BW routes, with protection operating at the ends of the pipe.

Ring nodes, which comprise in this case path terminating equipment (PTE), 3, 4, 5 and 6 are connected over fiber spans 10, 11, 12 and 13. Each data terminal 1, 2 is connected to a respective transport node 3, 4 over a user-network interface (UNIF) 20, 30. Since path protection for an UPSR is unidirectional, two redundant diverse routes are provided between the transport terminals 3 and 4. In the example of FIG. 3A these are a first route over span 10 and a second route over spans 13, 12, 11 passing through intermediate nodes 6 and 5.

The transport nodes are provided with SONET path protection switch/bridge capability, with the transmit end (which is node 3 for the traffic from data terminal 1 to data terminal 2) permanently bridged. The traffic travels towards node 4 along both working route 10 and protection route 13-12-11. The receiving node 4 selects the traffic as in the conventional path protection switching.

The difference from a conventional path protection switching protocol is that the protection route 8 has a much smaller BW than the route 7. This is shown in FIG. 3A by arrow 7 being thicker than arrow 8.

Figure 3B:
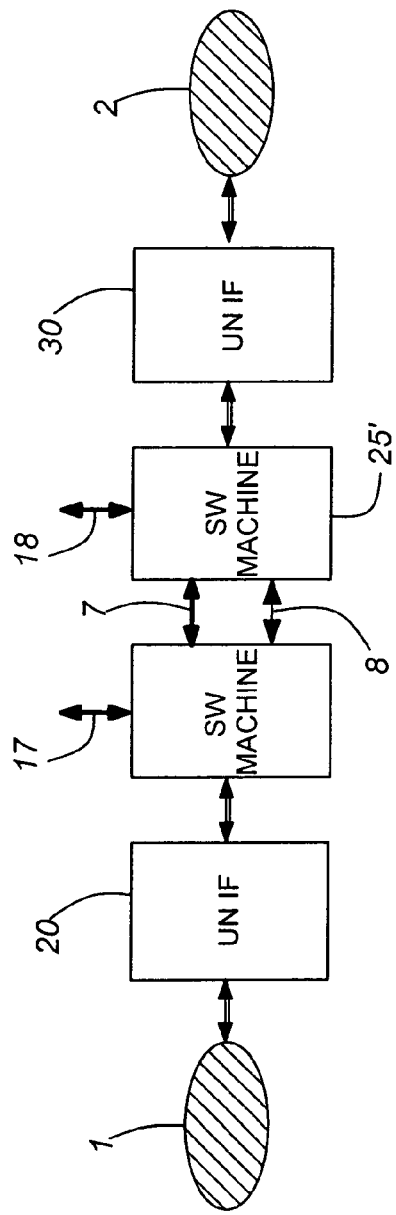
FIG. 3B is a logical view of a path protected squeezeable pipe for the communication network of FIG. 3A.

FIG. 3B illustrates a logical view of the communication network of FIG. 3A. Of relevance are interfaces 20 and 30, which are shown explicitly, and switch machines 25 and 25' at the respective nodes 3 and 4. Working route 7 and protection route 8 intuitively show the asymmetry of the pipe in the unsqueezed and squeezed state. In order to design a variable rate pipe, interfaces 20 and 30 must be able to support a variable data rate, and the switch machines 25 and 25' must also be able to switch between two paths that have a different rate.

Figure 3C:
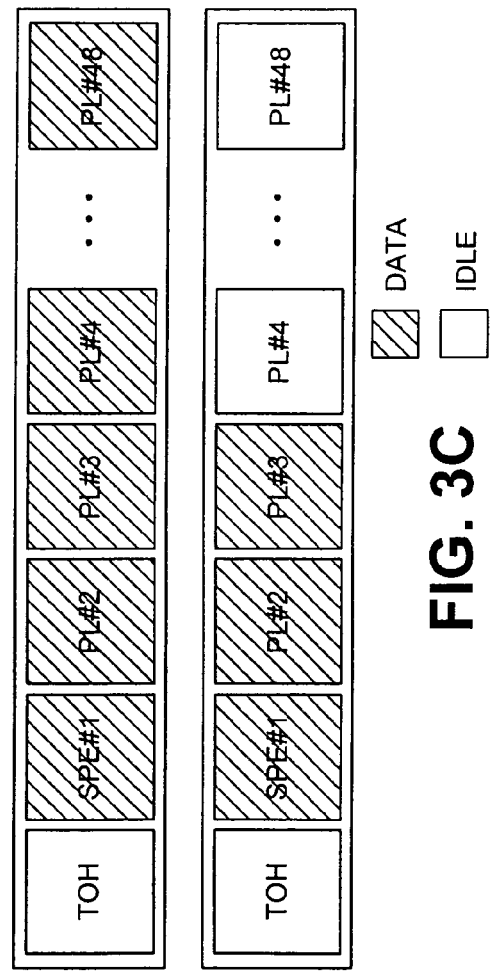
FIG. 3C illustrates an example of the pipe composition for a path protected squeezeable pipe.

FIG. 3C shows the pipe composition for a path protected squeezeable pipe. In this example, the BW of connection 7 is an OC-Nc, and in particular an STS-48c, and the BW of connection 8 is an STS-3c. The pipe in the non-squeezed condition comprises the transport overhead (TOH), the first SPE-1 with the POH for the entire container, and the payloads for the remaining 47 SPE-1's concatenated into the OC-48c. In short, the pipe transports TOH, POH and traffic. The TOH comprises section and line OAM&P information which allows signalling between switch functions 25 and 25', as shown by interfaces 17 and 18 in FIG. 3B. This signalling can be carried in an extended TOH, or it may operate on user definable channels. Failure detection may for example use the SONET G1 byte mechanism. Interfaces 17 and 18 may also be used for management status reporting, forced switch control, etc.

An example of how pipe composition d and port option a operate follows. At level L-3, variable rate interfaces 20 and 30 are placed at the data terminals 1 and 2, which transfer e.g. IP over SONET. Let's assume that interfaces 20 and 30 are OC-48c/OC-3c. A failure on connection 7 is detected by the switch 25' and signalled to switch 25. Switch 25 initiates a protection switching operation to redirect the traffic from connection 7 to connection 8, and informs, by signalling data user 1 that switching was performed.

Data user 1 changes the rate from an STS-48 to STS-3, by using only the first STS-3c in the STS-48 interface 20, rather than the entire STS-48. The remaining STS-45 is idle. Preferably, the switch 25 sends the OC-3c in the first position of the STS-48. The switch 25 then informs switch 25' that protection switching has taken place, and switch 25', in turn, informs user 2. In response, the data user 2 adjusts its operation to receive an STS-3c from interface 30.

As a result, a failure in the working route 7 is restored inside the 50 ms SONET/SDH switching time, but, since the protection route 8 is slower, the data user 1 will throttle back as the bandwidth performance is reduced. Nonetheless, the L-3 of the network does not lose the connection, but sees reduced performance. This allows flow control mechanisms of the higher layers to gracefully restore and recover.

Another way of performing rate adaptation is to use pipe composition d with port option b, where the data terminals are configured with more than one SONET port. With multiple ports available, rate adjustment can be performed by selective port activation/deactivation. The SONET interfaces with the respective ports could be asymmetric 1+1 protected (with unequal working and protection BW), or 1:1 protected, no extra traffic.

In another embodiment, option c–d, the interfaces 20 and 30 could be Ethernet 1000baseT. The working traffic is transmitted over un-squeezed pipe on route 7 in an STS-48c. For transmission efficiency, there may be two 1000baseT channels in this STS-48c, but for the purposes of this example they are treated in tandem. Switch function 25 is performing a frame mapping into the STS-48c, and switch function 25' performs the reverse mapping for data user 2.

In event of a failure on route 7, signalling between switches is used as described above for the option a–d. The traffic is redirected on route 8 in an STS-3. However there is no signalling across interfaces 20 and 30 between the EM and the data terminal other than pause frame flow control. This method of mapping is disclosed in the co-pending patent application Ser. No. 09/203,853 (Wiggins et al) filed Dec. 2, 1998 and assigned to Nortel Networks Corporation.

The '853 patent application is directed to a Ethernet to SONET/SDH mapping process, for the case when the Ethernet rate is greater than the SONET/SDH rate. An Ethernet pause frame, which provides a pause of appropriate length, is returned by the mapper to the Ethernet frame source in order to implement flow control to stop the Ethernet frame receive buffer in the mapper from overflowing and losing frames. The pause frame control recovery scheme allows protection switching operations on unmodified data equipment.

Application of this method to the embodiment under consideration provides rate adaptation, and effectively reduces the information transfer rate to the rate available, in this example an STS-3c. The squeezed pipe comprises the first SPE-1 with the POH for the entire container, and also the payload for the STS-1's #2 and #3. The remaining BW may service other traffic.

To prevent extra layers of protection and for greater BW efficiency, unprotected connections are preferable. If path protection is used on top of line protection, the network over-built is 300%.

An example of option c–d is to use for the working pipe 7 an Ethernet 100baseT, carried in an OC-3c as a virtually concatenated VT1.5. In event of a failure on working pipe 7, the switches 25 and 25' operate as in the previous embodiment to initiate a protection switch, and the data devices 1 and 2 are accordingly informed. In response to this signalling, the number of virtual containers across interfaces 20 and 30 is squeezed to the squeezed rate serviceable on link 8. This reduces the data rate of the interfaces from 100baseT to 10baseT (from the data perspective), but keeps the transmission interface at OC3. The data user 1 then changes mapping from 100baseT frames into the concatenated containers, to 10baseT into a smaller number of concatenated containers. The receiving equipment likewise changes mapping. The Ethernet mapper 30' will take corrective measures to compensate for the reduced rate.

Figure 4:
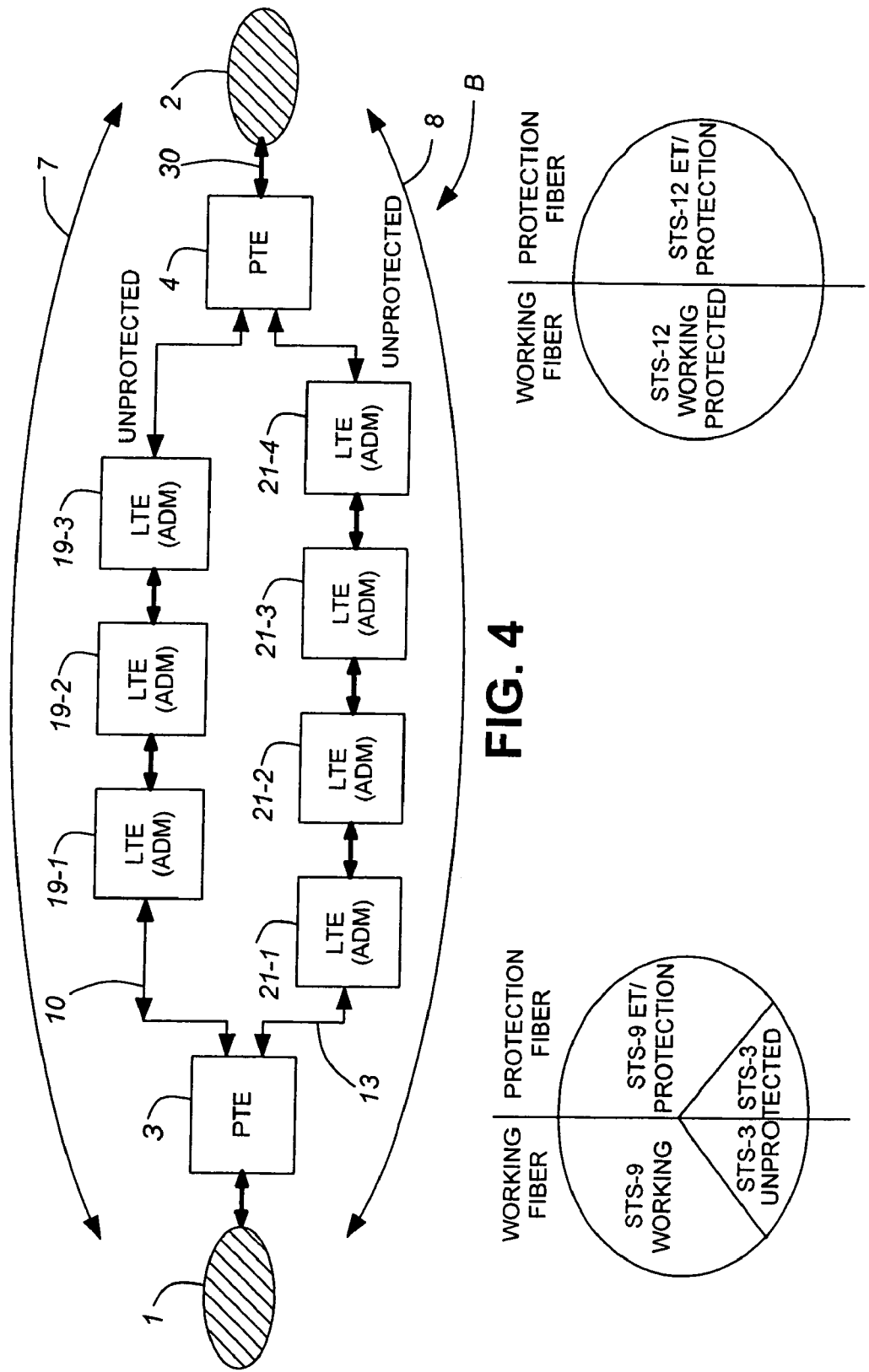
FIG. 4 illustrates an implementation of a symmetric path protected squeezeable pipe.

FIG. 4 illustrates a network B with unprotected connections, where the squeezeable pipe has a composition shown at e in FIG. 2. This option operates with two unprotected L-1 route diverse paths 10 and 13, and load sharing. Load sharing may take place in the router with option b–e, or in the mapper with option c–e. While load sharing allows for very efficient use of BW, it involves a rather complicated task of deciding which of the two paths a given packet should be sent out on, and the potential for some additional latency. Ideally, packets coming from a given stream should be routed over the same path to prevent related packets from arriving out of order.

It is difficult to associate a packet to a stream at layer two, therefore option b–e (the load sharing at the router) is preferred. NUT (Non-preemptable and unprotected traffic) protection is required for BW efficiency if line protection is also used in the network. No signalling is necessary with this option.

With option b, if route 7 is interrupted, the traffic between the data terminals can take place only along route 8, but the data terminals will squeeze the traffic normal sent over route 7 on route 8. The LTE nodes 19 and 21 on both routes are unaffected, since this is a path switching operation.

With path protection, it is better not to protect signal degrade SD conditions (transmission errors), as the BW lost due to transmission errors is significantly less than the BW lost when using a squeezed pipe. Naturally, the lost BW is relative; it depends on the extent of the signal degrade condition and on the BW reduction of the squeezed pipe. This is different form line protected squeezeable pipes, since line protection must act on SD to protect services other than the squeezeable pipes.

Bidirectional Line Protection for Squeezeable Pipes

Squeezeable pipes can also be used with bidirectional line protection. The line protected squeezeable pipes can be designed to squeeze unidirectionally, but signalling limitations with the SONET POH make unidirectional operation impractical.

As indicated above, 'protected class' refers to connections which have BW reserved for accommodating the traffic in case of a failure of the working connection. The term 'unprotected class' refers to connections that are not protected in the event of failure, and the 'selective protection' allows line protection to be provisioned on a connection basis. As such, the user can specify that no protection be provided for a given connection. This unprotected connection is sometimes referred as NUT (non-preemptable unprotected traffic). BW allocation for these types of connections is shown in FIGS. 5a and 5b.

Figure 5B:
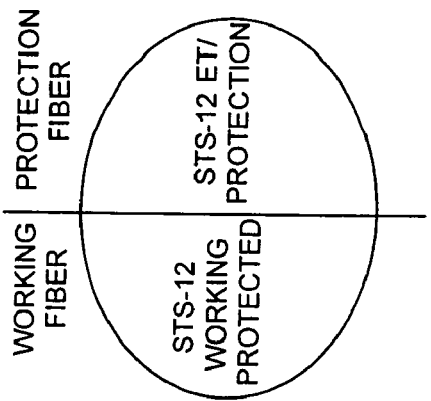
FIG. 5b shows an example for BW allocation for line protected/ET connections.
Figure 5A:
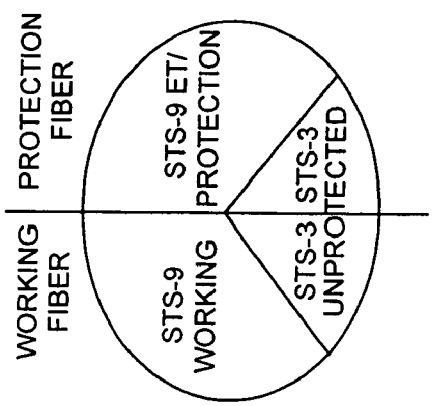
FIG. 5a illustrates an example for BW allocation for selective line protected connections.

FIG. 5a shows an example of the allocation of an STS-24 with selective protection. For example, working protected connection has an STS-9. Same BW of STS-9 is allocated to the ET/protection connection, so that in the case of a cut in the working fiber the traffic is fully protected, and the ET is dropped. The remaining STS-6, i.e. an STS-3 on both working and protection fibers, is unprotected.

In the case of protected connections, shown in FIG. 5b, the traffic on the working BW uses the protection BW in the case of a failure of the working fiber. Both working and protection connections have 50% of the total BW, which is in this example an STS-12, for a total BW of STS-24. The protection connection could be idle, or could carry extra traffic (ET) of lower priority. The ET is dropped in the case of a line protection switch.

Line protected squeezable pipes may be provisioned using a mix of currently available services, as shown in FIG. 2 at f and g. Option f provides for a non-route diverse asymmetric pipe with the BW in the squeezed state less than the BW in the unsqueezed state. SONET selective protection could be used to provide the protected/unprotected connections required for this embodiment.

Figure 6A:
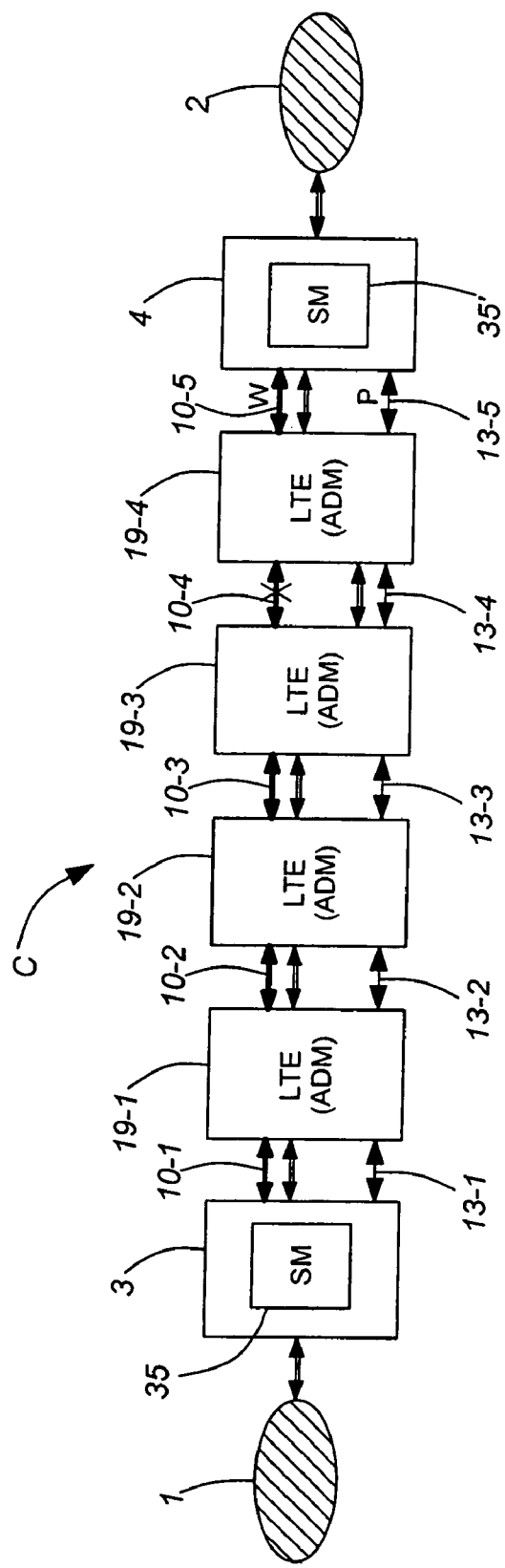
FIG. 6A illustrates the implementation of an asymmetric line protected squeezeable pipe.

FIG. 6A illustrates an implementation of option f. While this figure shows a linear network, it is to be understood that the invention also applies to BLSR's (bidirectional line switched rings). Linear network C connects data terminals 1 and 2, the path between PTE nodes 3 and 4 comprising two bidirectional connections passing through a plurality of LTE's, denoted with 19-1, 19-2, 19-3 and 19-4. The LTE's could be add-drop multiplexers, which access signals that need to be dropped or inserted at that LTE, the rest of the traffic continuing straight through. As well known, a line (SONET term) or multiplex section (SDH term) is a portion of the transmission facility between two consecutive LTE's, in FIG. 5A spans 10-1 and 13-1; or 10-2 and 13-2; or 10-3 and 13-3; or 10-4 and 13-4, or 10-5 and 13-5.

In network C the traffic between any two LTE is bidirectional on each span, with working and protection timeslots allocated to the traffic on both fibers 10 and 13, with the protection BW less than the working BW.

FIG. 6A shows in double lines the route of the squeezed pipe in case of an interruption of traffic from PTE 3 to 4 on span 10-4. In this scenario, node 19-4 detects the failure and initiates a line protection switch, where the W-E working traffic of the working BW is switched from line 10-4 to line 13-4, using the squeezed protection BW. Bidirectional line switching protects the link between nodes 19-3 and 19-4.

As in the case of PPSP, UNIF's 20 and 30 provide rate adaptation at L-2/L-3. Protection switching on links 10-4 must be signalled to the terminal nodes 3 and 4 since the transmit bandwidth must be equal to the bandwidth at the narrowest part of the end-to-end pipe. However, the unaffected links do not switch the traffic from fiber 10 to fiber 13.

A pipe squeeze can be initiated by any bidirectional line switched spans in the network along the path between the data terminals. With typical SONET connections, POH is not touched at tandem nodes. However, for the squeezeable pipes, a tandem node which has an active line protection switch, must be provided with means for signalling at the path sublayer to inform the PTE nodes of the BW reduction. The signalling can use SONET POH, for example STS Path AIS and STS unequipped, which implies access to the POH at the affected LTE nodes. Tandem nodes not directly involved in any protection switch or required to squeeze the pipe need only passthrough the entire pipe payload intact.

The sequence of events in the scenario shown in FIG. 6A, starts with node 19-4 detecting the failure and initiating a line protection switch. The traffic between nodes 19-3 and 19-4 is moved from fiber 10-4 to fiber 13-4. The pipe is immediately squeezed in both directions on this span.

Nodes 19-3 and 19-4 signal to the PTE nodes 3 and 4 that a squeezing operation occurred, by inserting the STS path AIS into the squeezed out STSs, namely into the higher numbered STS's which are no longer filed with data.

On receipt of the STS Path AIS patterns corresponding to an actively squeezed pipe, PTE nodes 3 and 4 switch to the squeezed mode of operation in both receive and transmit directions. STS unequipped is sent in the unused STS's of the squeezed pipe.

For recovery, node 19-4 detects the line recovery. Following a wait-to-restore (WTR) period, bidirectional line switching drops on the link between node 19-3 and 19-4. The pipe is immediately expanded in both directions between nodes 19-3 and 19-4. Nodes 19-3 and 19-4 are now tandem nodes, hence they merely pass through the squeezeable pipe payload intact.

A PTE node detects recovery of a squeezeable pipe when the STS path AIS is no longer being received on the formerly squeezed out STS's. A PTE node detects recovery from a squeezed state when the higher order STS-1 of a squeezeable pipe connection no longer contains STS-path AIS. Typically, following a recovery, it will be STS-unequipped which will be received from the far end.

On receipt of STS unequipped pattern corresponding to a recovered pipe, PTE node 4 switches to the normal mode of operation in the transmit direction. Payload is placed into all provisioned STS's. When all STS's associated with a given squeezeable pipe have no path condition, the receive direction also reverts to full BW operation.

Figure 6B:
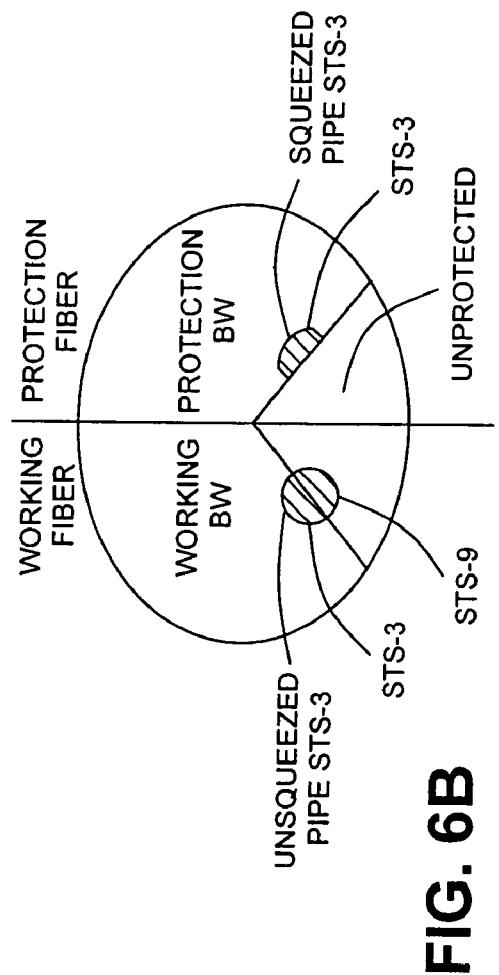
FIG. 6B illustrates the BW allocation for the asymmetric line protected squeezeable pipe of FIG. 6A.

FIG. 6B illustrates the BW allocation for the asymmetric non-route diverse line squeezable pipe of FIG. 6A. The squeezeable pipe is illustrated as the shaded circle, transporting an STS-3 of working protected traffic and an STS-9 of unprotected traffic during normal operation. In the case of a pipe squeeze, the working protected traffic is moved on the protection fiber, while the unprotected traffic is dropped. The pipe squeezes from an STS-12 to an STS-3 in this example.

Option f may use one of options a, b or c for the variable rate interfaces 20, 30. the operation of these interfaces was detailed in connection with path switched squeezeable pipes.

Figure 7:
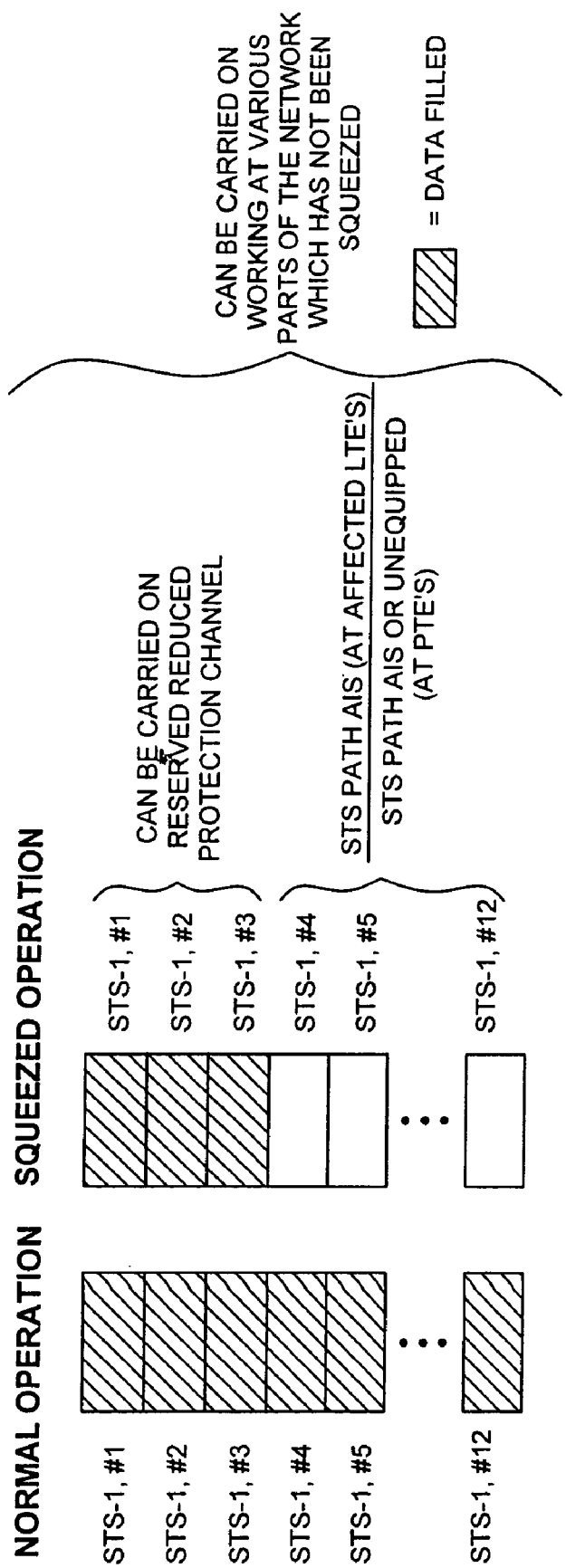
FIG. 7 shows the pipe composition for a line protected squeezeable pipe.

FIG. 7 illustrates an example of the pipe composition for the LPSP of FIG. 6A. The STS's that carry a payload of information are shaded. In the unsqueezed state, the pipe carries the TOH, the POH and the payload for all twelve STS-1s, multiplexed into an STS-12. In the squeezed state, the pipe carries the payload for STS-1 #1–3 only. While normally an LTE does not access the POH, in this case the signalling is provided by inserting the STS path AIS for STS #4–12 at LTE 19-4.

Figure 8:
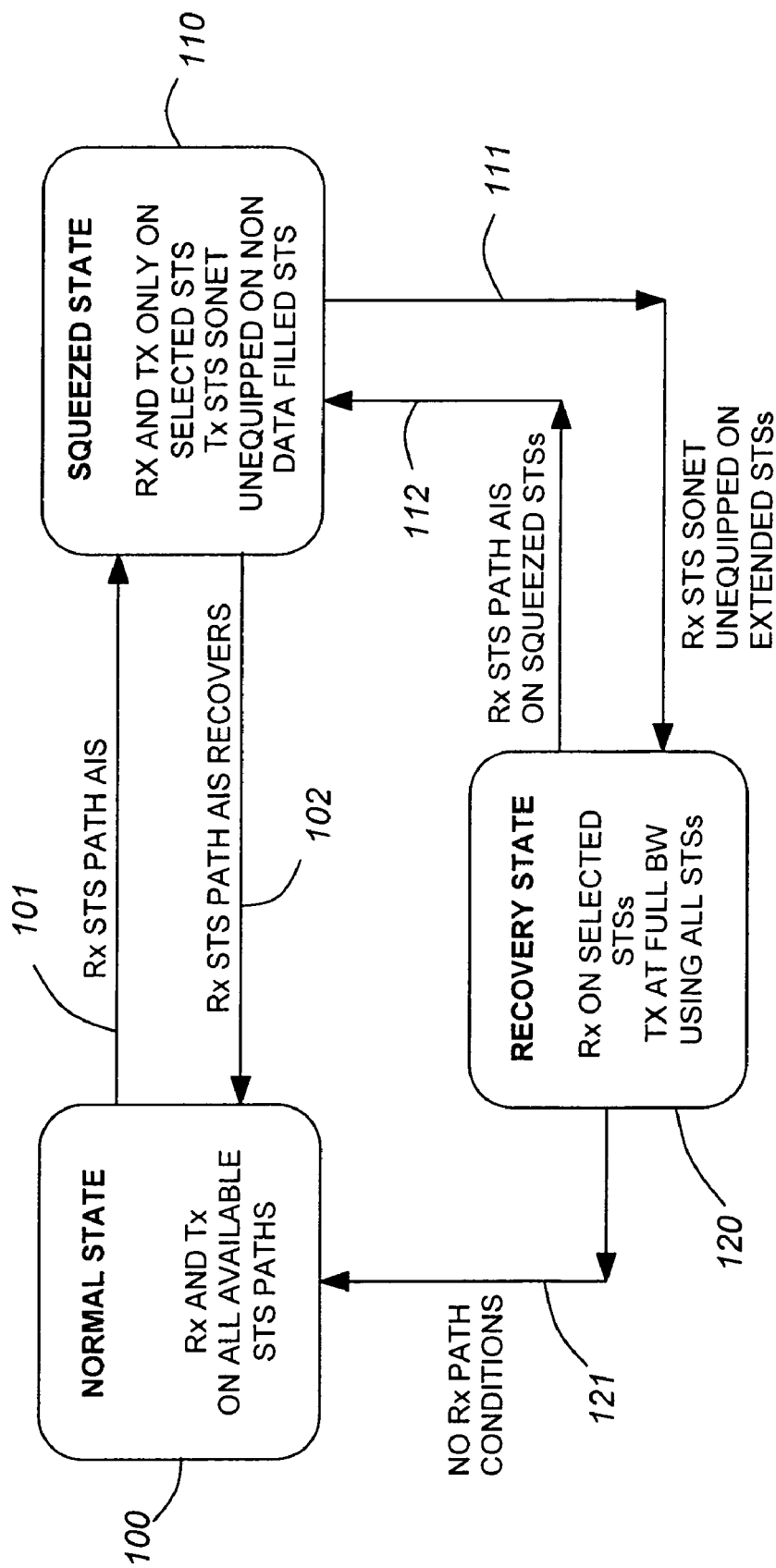
FIG. 8 illustrates a state diagram for the PTE's of the network of FIG. 6A.

FIG. 8 illustrates a three-state diagram for e.g. PTE node 4 of the network of FIG. 6A. In the normal state 100, the pipe is unsqueezed, meaning that a PTE receives and transmits all the STS of the allocated working BW. During the squeezed state 110, the PTE node transmits and receives only a reduced (selected) number of STS's, which are STS #1–3 in the example above. Recovery state 120 is characterized by the reception of the squeezed pipe (STS-3) and transmission of the unsqueezed pipe (STS-12).

Transition from the normal state 100 to squeezed state 110 is triggered by the STS path AIS received from a LTE node involved in a line protection switching operation, as shown by 101.

If an STS 'unequipped' code is received in the extended STS path while node 4 is in the squeezed state 110, shown at 111, the PTE node 4 will transition to the recovery state 120, and will begin transmitting at full BW. The pipe reverts to full BW operation in the receive direction when there are no path conditions on all of the received STS's associated with the given pipe, as shown at 121.

A PTE node transitions from the recovery state 120 back to a squeezed state if it receives STS path AIS on the squeezed out STS's, shown by line 112. Finally, transitions from squeezed state 110 to the normal state 100 take place when the STS path AIS recovers, line 102.

Option g for LPSP provides for a protected and ET pipe composition using load sharing. In this case, the network must have provision for an extra traffic (ET) path, since this scheme uses working and ET bandwidth for an 100% utilization. Since this is a line protection scheme, signalling is necessary.

Figure 9A:
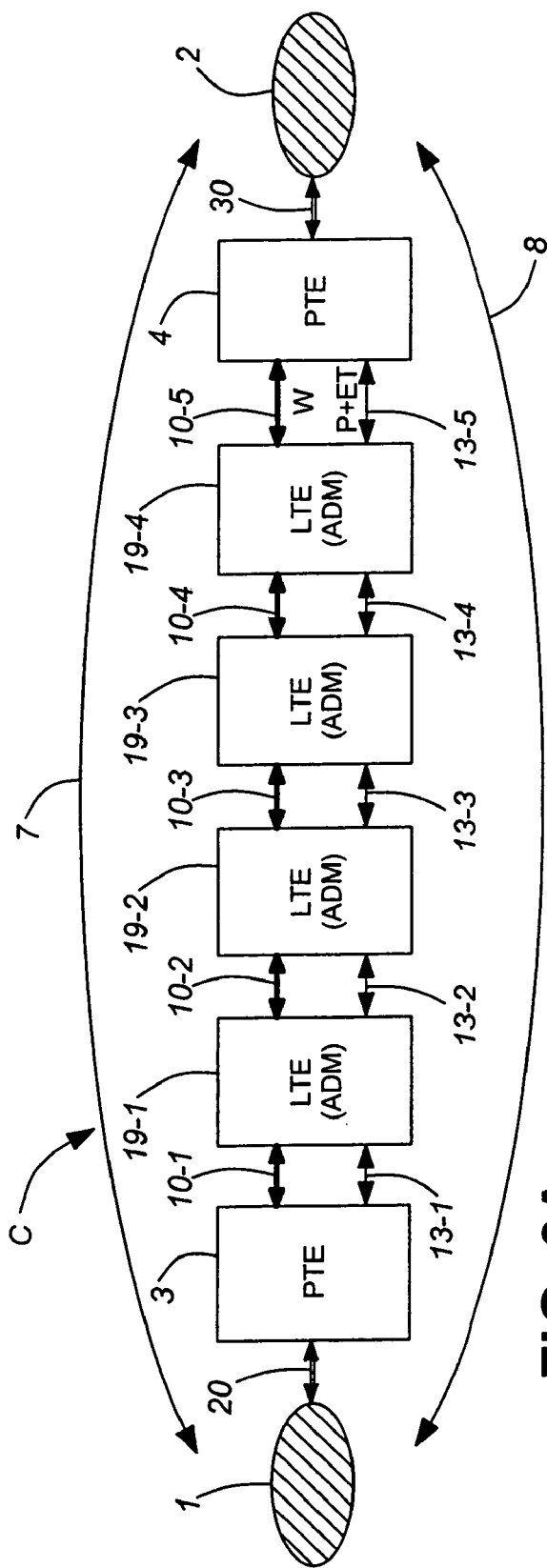
FIG. 9A shows the implementation of a symmetric line protected squeezeable pipe.
Figure 9B:
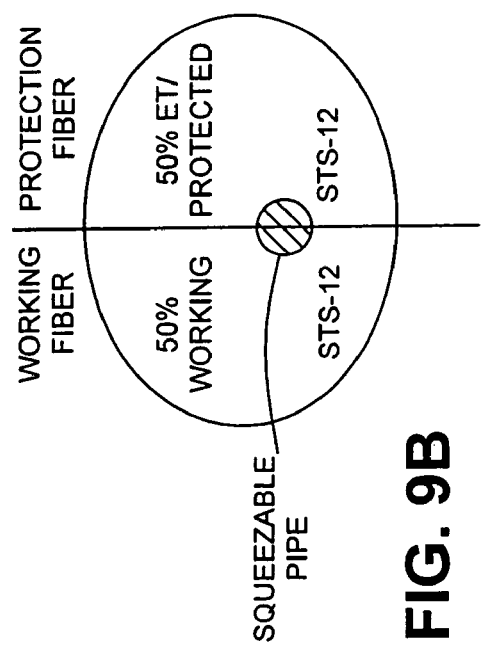
FIG. 9B illustrates the BW allocation for the symmetric line protected squeezeable pipe of FIG. 9A.

FIG. 9A shows an implementation of this option. The BW allocation for the symmetric line squeezed pipe is shown in FIG. 9B. In this case, load sharing is done by either the router (option b) or the Ethernet mapper (option c).

What is claimed is:

1. An optical communication network for exchanging traffic between two data terminals connected at a respective end node, and recovering traffic in case of a fault at the physical layer, comprising:

an adaptive rate interface at each said end node for changing the transmit and receive rate of traffic from a fast rate to a slow rate during a protection switch and from the slow rate to the fast rate upon return to normal operation from the protection switch;

a link between said adaptive rate interfaces, the link including a working transmission facility for accommodating a traffic pipe of a first bandwidth (BW) corresponding to said fast rate during normal operation, and a protection transmission facility for accommodating a squeezed traffic pipe of a second bandwidth (BW) corresponding to said slow rate during the protection switch; and protection switching means for detecting an interruption in a flow of traffic through said working transmission facility and for operating the protection switch in response to the interruption, so that the flow of traffic traversing said working transmission facility at the fast rate switches to and traverses said protection transmission facility at the slow rate.

2. A network as claimed in claim 1, wherein said protection switching means operate at a path sublayer.

3. A network claimed in 2, wherein said adaptive rate interface is provided in said data terminal and operates to automatically change the data rate of the received and transmitted traffic between said fast and slow rates, in response to a flow control parameter.

4. A network as claimed in claim 2, wherein said adaptive rate interface is provided in said data terminal and operates to change the data rate of the received and transmitted traffic between said fast and said slow rates in response to a rate change signal received from said protection switching means.

5. A network as claimed in claim 1, wherein said adaptive rate interface comprises:

a plurality of ports on said data terminal;

means for turning on and off each said port, for automatically changing the operation data rate of the received and transmitted traffic between said fast and said slow rate in response to a flow control parameter.

6. A network as claimed in claim 1, wherein said adaptive rate interface comprises:
- a plurality of ports on said data terminal;
- means for turning on and off each said port, for changing the operation data rate of the received and transmitted traffic between said fast and said slow rate in response to a rate change signal received from said protection switching means.

7. A network as claimed in claim 1 wherein said adaptive rate interface comprises an Ethernet mapper connected between said data terminal and said node for changing the mapping of data packets between said fast and said slow rates.

8. A method of operating an adaptive rate interface connected between a data terminal and an optical communication network comprising:
- exchanging traffic at a first rate over a working route between said data terminal and said network in a normal state of operation;
- transitioning from exchanging traffic at the first rate over the working route to exchanging traffic at a second rate slower than the first rate over a protection route between said data terminal and said network during a protection switching operation; and
- transitioning from exchanging traffic at said slower second rate to said normal state of operation during a recovery state of operation.

9. A method as in claim 8, wherein said network is a SONET/SDH network, said first rate is a STS-N, and said second rate is a STS-M, where M<N.

10. A method as claimed in claim 9, wherein the step of transitioning from said normal state of operation to said protection switching operation begins on receipt of STS path AIS.

11. A method as claimed in claim 9, wherein the step of transitioning from said protection switching operation to said normal state of operation begins on receipt of a recovered path AIS.

12. A method as claimed in claim 9, further comprising transitioning from said protection switching operation to said recovery state of operation on receipt of an unequipped code on non-data field STSs.

13. A method as claimed in claim 9, further comprising transitioning from said recovery state of operation to said normal state of operation when no path conditions are detected in the incoming traffic.

14. A method as claimed in claim 9, further comprising transitioning from said recovery state of operation from said protection switching operation on receipt of path AIS of all said STS-M.

15. A method of providing traffic recovery in a transport network connecting two data terminals, comprising:
- allocating a total bandwidth to traffic transmitted between the data terminals;
- distributing the total bandwidth between a first unprotected route and a second unprotected route between the data terminals;
- transmitting unprotected traffic over the first route at a first transmission rate and unprotected traffic over the second route at a second transmission rate during normal operation of the transport network;
- detecting an interruption of the transmission of unprotected traffic over the first route; and
- upon detection of the interruption, switching the unprotected traffic from being transmitted over the first route to being transmitted over the second route, wherein the switched traffic is transmitted over the second route at a slower transmission rate than the first transmission rate.

16. A method as claimed in claim 15, wherein said step of transmitting comprises operating said data terminals to provide load sharing between said two routes.

17. A method as claimed in claim 16, wherein the step of switching the traffic is operating at a path sublayer of said transport network.

18. A method as claimed in claim 16, wherein the step of switching the traffic is operating at a line sublayer of said transport network, and bandwidth allocated to the first route and bandwidth allocated to the second route are allocated from the protected and ET connections class, respectively.

19. A method as claimed in claim 15, further comprising maintaining the bandwidth allocated to said second route unchanged during the interruption of the first route.

20. The method of claim 15, further comprising receiving during the interruption a flow control message used for adapting to the slower transmission rate of the traffic switched over the second route.

* * * * *

UNITED STATES PATENT AND TRADEMARK OFFICE
CERTIFICATE OF CORRECTION

PATENT NO.        : 6,940,808 B1
APPLICATION NO.   : 09/548667
DATED             : September 6, 2005
INVENTOR(S)       : Shields et al.

It is certified that error appears in the above-identified patent and that said Letters Patent is hereby corrected as shown below:

In the claims: Col. 12 line 35, after "operation" delete ",".

line 43, after "interruption" delete ",".

Signed and Sealed this

Twenty-third Day of January, 2007

JON W. DUDAS
*Director of the United States Patent and Trademark Office*